(12) United States Patent
Reineke et al.

(10) Patent No.: US 11,848,835 B2
(45) Date of Patent: Dec. 19, 2023

(54) SYSTEM FOR QUANTIFYING DATA CENTER INFRASTRUCTURE UTILIZATION UNITS

(71) Applicant: Dell Products L.P., Round Rock, TX (US)

(72) Inventors: Nicole Reineke, Northborough, MA (US); Hanna Yehuda, Newton, MA (US); Eitan Segal, London (GB)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/580,011

(22) Filed: Jan. 20, 2022

(65) Prior Publication Data
US 2023/0231781 A1    Jul. 20, 2023

(51) Int. Cl.
*H04L 43/045* (2022.01)
*G06Q 10/0639* (2023.01)

(52) U.S. Cl.
CPC ..... *H04L 43/045* (2013.01); *G06Q 10/06393* (2013.01)

(58) Field of Classification Search
None
See application file for complete search history.

(56) References Cited

U.S. PATENT DOCUMENTS

| | | | |
|---|---|---|---|
| 7,945,902 B1 | 5/2011 | Sahoo | |
| 8,447,569 B1 | 5/2013 | Marwah et al. | |
| 9,619,649 B1 | 4/2017 | Yun | |
| 10,782,990 B1 | 9/2020 | Suarez et al. | |
| 2005/0033600 A1 | 2/2005 | Geddes et al. | |
| 2005/0278202 A1 | 12/2005 | Broomhall et al. | |
| 2006/0235778 A1 | 10/2006 | Razvi et al. | |
| 2007/0288286 A1 | 12/2007 | Linehan | |
| 2009/0307094 A1 | 12/2009 | Manos | |
| 2010/0250298 A1 | 9/2010 | Channabasavaiah et al. | |
| 2010/0274639 A1 | 10/2010 | Tsuji et al. | |
| 2011/0087522 A1 | 4/2011 | Beaty et al. | |
| 2011/0313808 A1 | 12/2011 | Kavanagh et al. | |
| 2013/0275263 A1 | 10/2013 | Carlin, Jr. et al. | |
| 2013/0290932 A1 | 10/2013 | Kruglick | |
| 2014/0052500 A1 | 2/2014 | Vallapuzha et al. | |
| 2014/0068073 A1* | 3/2014 | Peles | G06Q 10/0639 709/224 |
| 2014/0095263 A1 | 4/2014 | McAlister et al. | |
| 2014/0172678 A1 | 6/2014 | Stephens et al. | |

(Continued)

OTHER PUBLICATIONS

List of Patents or Applications Treated as Related, Aug. 2022.

(Continued)

*Primary Examiner* — Anh Nguyen
(74) *Attorney, Agent, or Firm* — Terrile, Cannatti & Chambers; Stephen A. Terrile

(57) ABSTRACT

A system, method, and computer-readable medium are disclosed for performing a data center monitoring and management operation. The data center monitoring and management operation includes: identifying a data center infrastructure utilization unit associated with an information technology (IT) environment, the IT environment including a data center asset; analyzing the IT environment based upon the data center infrastructure utilization unit; and, presenting a data center infrastructure utilization quantification based upon the analyzing.

17 Claims, 14 Drawing Sheets

(56) References Cited

U.S. PATENT DOCUMENTS

| | | |
|---|---|---|
| 2015/0006260 A1 | 1/2015 | Harris |
| 2015/0332185 A1 | 11/2015 | Zakkam et al. |
| 2015/0350174 A1 | 12/2015 | Reno et al. |
| 2015/0350234 A1 | 12/2015 | Reno et al. |
| 2015/0358207 A1 | 12/2015 | Baldock et al. |
| 2016/0019489 A1 | 1/2016 | Bergmann et al. |
| 2016/0080422 A1 | 3/2016 | Belgodere et al. |
| 2016/0380862 A1* | 12/2016 | Shapsa ............... G06Q 10/0637 709/224 |
| 2017/0006410 A1 | 1/2017 | Barrett et al. |
| 2017/0230251 A1 | 8/2017 | Dube et al. |
| 2018/0005121 A1 | 1/2018 | Hoque et al. |
| 2018/0285997 A1 | 10/2018 | Bostick et al. |
| 2018/0300793 A1 | 10/2018 | Chen et al. |
| 2018/0349101 A1 | 12/2018 | Lyras et al. |
| 2019/0095814 A1 | 3/2019 | Dubovsky et al. |
| 2019/0213061 A1 | 7/2019 | Campos-Guajardo et al. |
| 2019/0243968 A1 | 8/2019 | Gordeychik et al. |
| 2019/0268233 A1 | 8/2019 | Singh |
| 2020/0026851 A1 | 1/2020 | Dhanka et al. |
| 2020/0159638 A1 | 5/2020 | Gupta et al. |
| 2020/0371896 A1 | 11/2020 | Mathur et al. |
| 2021/0027401 A1 | 1/2021 | Hovhannisyan et al. |
| 2021/0133670 A1 | 5/2021 | Cella et al. |
| 2021/0240551 A1 | 8/2021 | Joyce et al. |
| 2021/0390562 A1 | 12/2021 | Reznic et al. |
| 2022/0012105 A1* | 1/2022 | Chagam Reddy .... G06F 9/5088 |
| 2022/0078072 A1 | 3/2022 | Rayes et al. |
| 2022/0247635 A1 | 8/2022 | Guim Bernat et al. |
| 2022/0414576 A1 | 12/2022 | Reineke et al. |

OTHER PUBLICATIONS

Sunitha Abburu et al., Ontology Storage Models and Tools: An Authentic Survey, J. Intell. Syst. 2016; 25(4): 539-553, https://www.degruyter.com/document/doi/10.1515/jisys-2014-0167/html, published online Aug. 22, 2015.

List of Patents or Applications Treated as Related, Oct. 2022.

Behi et al., Consumer Engagement in Virtual Power Plants through Gamification, 2020 5th International Conference on Power and Renewable Energy (ICPRE), Shanghai, China, 2020, pp. 131-137, doi: 10.1109/ICPRE511942020.9233110, pp. 131-133 (Year: 2020).

* cited by examiner

SYSTEM FOR QUANTIFYING DATA CENTER INFRASTRUCTURE UTILIZATION UNITS

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: identifying a data center infrastructure utilization unit associated with an information technology (IT) environment, the IT environment including a data center asset; analyzing the IT environment based upon the data center infrastructure utilization unit; and, presenting a data center infrastructure utilization quantification based upon the analyzing.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: identifying a data center infrastructure utilization unit associated with an information technology (IT) environment, the IT environment including a data center asset; analyzing the IT environment based upon the data center infrastructure utilization unit; and, presenting a data center infrastructure utilization quantification based upon the analyzing.

In another embodiment the invention relates to a computer-readable storage medium embodying computer program code, the computer program code comprising computer executable instructions configured for: identifying a data center infrastructure utilization unit associated with an information technology (IT) environment, the IT environment including a data center asset; analyzing the IT environment based upon the data center infrastructure utilization unit; and, presenting a data center infrastructure utilization quantification based upon the analyzing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 7A and 7B, generally referred to as FIG. 7, show example screen presentations of user interfaces generated during an organizational value data center infrastructure recommendation operation.

DETAILED DESCRIPTION

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads. Accordingly, various aspects of the invention reflect an appreciation that efficient and effective monitoring and management of certain data center assets may assist in optimizing the availability, performance, and reliability of the services offered by a data center.

Certain aspects of the invention likewise reflect an appreciation that companies are often held accountable to different organization values such as sustainability priorities, which can be impacted by geography, vertical considerations and stakeholder values. Certain aspects of the invention likewise reflect an appreciation that known information technology (IT), cloud and infrastructure (some or all of which are generally referred to as an IT environment) organization value tradeoffs are often non-obvious and not clearly measurable.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
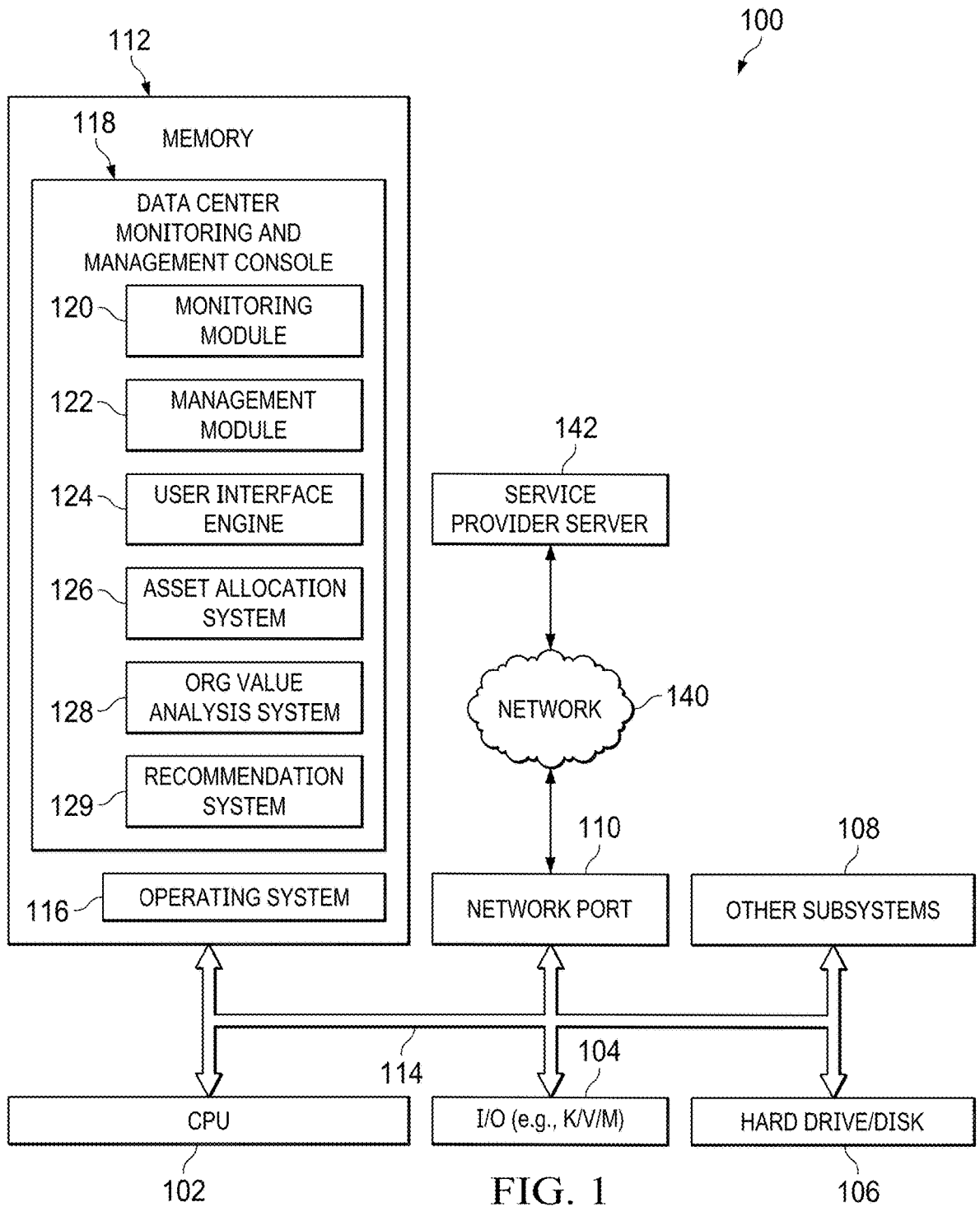
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, a user interface engine 124, an asset allocation engine 126, an organizational value analysis engine 128, a recommendation engine 129 and a utilization quantification engine 131 or a combination thereof. In certain embodiments, the data center monitoring and management console 118 may be implemented to perform a data center monitoring and management operation. It will be appreciated that the data center monitoring and management operation may be applied to on-premises IT environments, cloud environments or a combination thereof.

In certain embodiments, the data center monitoring and management operation includes an organizational value analysis operation, as described herein. In certain embodiments, the organizational value analysis operation includes a sustainability analysis operation, as described herein. In certain embodiments, the data center monitoring and management operation may be performed during operation of an information handling system 100. In various embodiments, performance of the data center monitoring and management operation may result in the realization of improved monitoring and management of certain data center assets, as described in greater detail herein. In certain embodiments, the organizational value analysis engine 128 performs an organization value analysis operation which facilitates determination and prioritization of organizational value goals. In certain embodiments, the organization value analysis operation suggests goal-aligned utilization of resources and provides data-driven measurements and insights related to the organizational value goals. In certain embodiments, the organization value goals include one or more of sustainability goals, security goals, availability goals (also referred to as service level agreement goals) trustworthiness goals, simplicity goals, humane technology goals, best practices goals, cost savings goals, VIP club goals (i.e., top level service tier goals), brand loyalty goals, existing environment/heterogeneous support goals, geography goals and diversity and inclusion goals. It will be appreciated that while many of these goals may be vague and cannot easily be used for automated decision making or sales suggestions, performance of the organization value analysis operation automates infrastructure decisions, such as complex IT infrastructure, to take into account specified organization value goals. In certain embodiments, the data center monitoring and management operation includes a data center infrastructure utilization quantification operation, as described herein.

Figure 2:
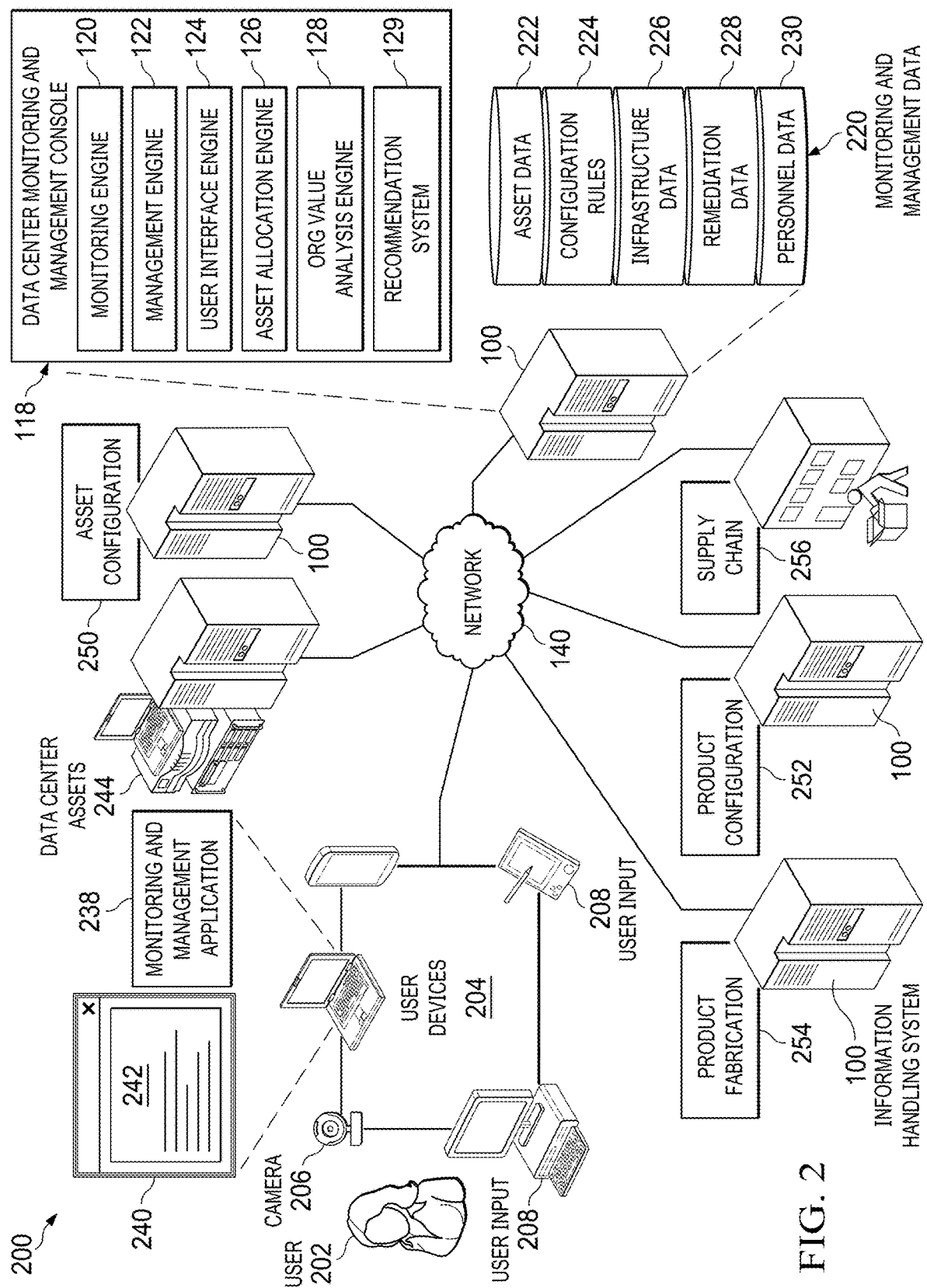
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software, firmware, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244. As used herein, configuring an aspect of data center infrastructure broadly refers to any task, function, procedure, or process performed, directly or indirectly, within a data center monitoring and management environment 200 to procure, deploy, configure, implement, operate, monitor, manage, maintain, or remediate one or more data center assets.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation. A data center recommendation operation, as used herein, broadly refers to any function, task, procedure, or process performed, directly or indirectly, within a data center monitoring and management environment 200 to retrieve, generate, revise, update, or store relating to a data center infrastructure recommendation. A data center infrastructure utilization operation, as used herein, broadly refers to any function, task, procedure, or process performed, directly or indirectly, within a data center monitoring and management environment 200 to retrieve, generate, revise, update, or store information relating to data center infrastructure utilization quantification.

In certain embodiments, the data center monitoring and management console 118 may be implemented to receive an alert corresponding to a particular data center issue. In various embodiments, the data center monitoring and management console 118 may be implemented to receive certain information associated with the operation of a particular data center asset 244. In certain embodiments, such operational information may be received through the use of telemetry approaches familiar to those of skill in the art. In various embodiments, the data center monitoring console 118 may be implemented to process certain operational information received from a particular data center asset to determine whether a data center issue has occurred, is occurring, or is anticipated to occur.

In certain embodiments, the data center monitoring and management console 118 may be implemented to include a monitoring module 120, a management monitor 122, a user interface (UI) engine 124, an asset allocation engine 126, an organizational value analysis engine 128, a recommendation engine 129 and a utilization quantification engine 131, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In various embodiments, the UI engine 124 may be implemented to generate a UI for the provision, or receipt, of certain information associated with the monitoring, or management, of a particular data center asset 244. In various embodiments, the asset allocation engine 126 may be implemented to perform a tangible data center asset allocation operation, described in greater detail herein. In various embodiments, the organizational value analysis engine 128 may be implemented to perform an organizational value analysis operation, described in greater detail herein. In various embodiments, the recommendation engine may be implemented to perform a recommendation operation, as described in greater detail herein. In various embodiments, the utilization quantification engine may be implemented to perform a data center infrastructure utilization operation, as described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 222, data center asset configuration rules 224, data center infrastructure data 226, data center remediation data 228, data center personnel data 230 and data center quantification data 231.

As used herein, data center asset data 222 broadly refers to information associated with a particular data center asset 244, such as an information handling system 100, which can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 222 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

As used herein, data center quantification data 231 broadly refers to any quantification information associated with a particular data center asset 244, such as an information handling system 100, which can be read, measured, and structured into a usable format. For example, the quantification information could include a cost associated with an aspect of the particular data center asset 244. Also, for example the quantification information could include a unit by which the cost is calculated. In certain embodiments, the data center quantification data 231 includes the data center infrastructure utilization quantification which is used for sales and billing interactions for a particular customer.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform a sales analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface.

In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118. In certain embodiments, the UI engine 124 may be implemented to generate the data center monitoring and management console UI 240, or the graphical representation 242 presented therein, or both.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. It will be appreciated that the data center monitoring and management application may be applied to various types of IT environments including data centers, cloud ecosystems and multi-domain monitoring, or any combination thereof. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

It will be appreciated that identifying information technology infrastructure configurations which align to particular organizational values can be of great value to certain customers. In various embodiments, the organizational value analysis operation, described in greater detail herein, allows customers to identify which information technology infrastructure configurations are of high value to their organization and which information technology infrastructure configurations align to certain organizational values of the customer.

For example, a particular customer might indicate that they would be willing to pay more for infrastructure, such as information technology infrastructure, if it could be shown that this information technology infrastructure helps the customer meet a particular organizational value such as their sustainability goals. This particular customer could desire to make infrastructure automation decisions that support their sustainability goals. For example, with a particular customer, their sustainability goals might include a carbon emissions net-neutral sustainability goal. This might be referred to by the customer as their green information technology initiative.

In another example, a particular customer, such as a healthcare provider might have a sustainability goal to reuse existing materials instead of acquiring new materials. In this example, the customer would be interested in identifying IT infrastructure configurations which included assets which are made of recycled or repurposed materials.

Various aspects of the present disclosure include an appreciation that simply converting hosting environments to use solar panels on a data center is not enough to show support of a customer's sustainability goals. Such a configuration does not address rules of trust concerns customer may have. Additionally, such a configuration does not support transparency and choice as related to sustainability. Additionally, such a configuration does not address specific sustainability values of a particular customer.

Various aspects of the present disclosure include an appreciation that a sustainability goal can include one or more of a plurality of specific sustainability priorities. For example, these sustainability priorities can include one or more of a lowest power consumption priority, a solar power consumption priority, a wind power consumption priority, a lowest carbon emission priority, a reuse of equipment priority, a recycled material priority, a particular vendor/manufacturer priority, and a geographic eco rating priority.

The sustainability analysis operation, described in greater detail herein, allows a customer to effectively make and measure infrastructure configuration decisions in support of some or all of their particular sustainability priorities. Accordingly, the sustainability analysis operation captures customer sustainability values, measures these particular sustainability values against infrastructure and generates sustainability focused infrastructure configuration recommendations thereby enabling informed choices by an organization. In certain embodiments, the infrastructure configuration recommendations are transparent, i.e., the recommendations include supporting details regarding why and how a particular infrastructure configuration recommendation addresses the particular sustainability goals of the particular customer.

In certain embodiments, the sustainability analysis operation uniquely creates sustainability values in a way that enables transparency in complex automation (i.e., complex IT infrastructure configurations). With the sustainability operation, a user can identify customer preference related to sustainability. The sustainability operation suggests migration or automation based on stated values and likely connected values. In certain embodiments, the sustainability analysis operation models and updates the customer preferences based on customer's actions, e.g. suggesting updates to reflect recent choices.

In certain embodiments, the sustainability analysis operation includes a sustainability value that may be set either specifically or generally as well as by automation type. In certain embodiments, the automation type can include one or more a provisioning automation type, a migrating automation type and an optimizing automation type. For example, if the automation is about migrating high priority workloads then a configuration might use goals which prioritize performance over power consumption whereas if the automation is for automating new applications, then a configuration might use a set of goals which provision in locations having the best energy source. By allowing for the sustainability value to be set generally and by automation type, the sustainability analysis operation makes proactive assertions that are aligned with the customer needs. The customer and vendor can use the sustainability analysis operation to establish whether the goals of the automation are in alignment with an organization's sustainability goals.

In various embodiments, the sustainability analysis operation is implemented as hardware, data centers, and electrical grid providers are publishing topological information indicating sustainability metrics. In various embodiments, the sustainability metrics include one or more of a source of electricity (solar, wind, oil, coal, etc.), power consumption by workload and asset, hardware composition (materials/parts), manufacturer supply chain green ratings and geographic sustainability ratings (such as air, water, or other environmental quality indicators).

Figure 3:
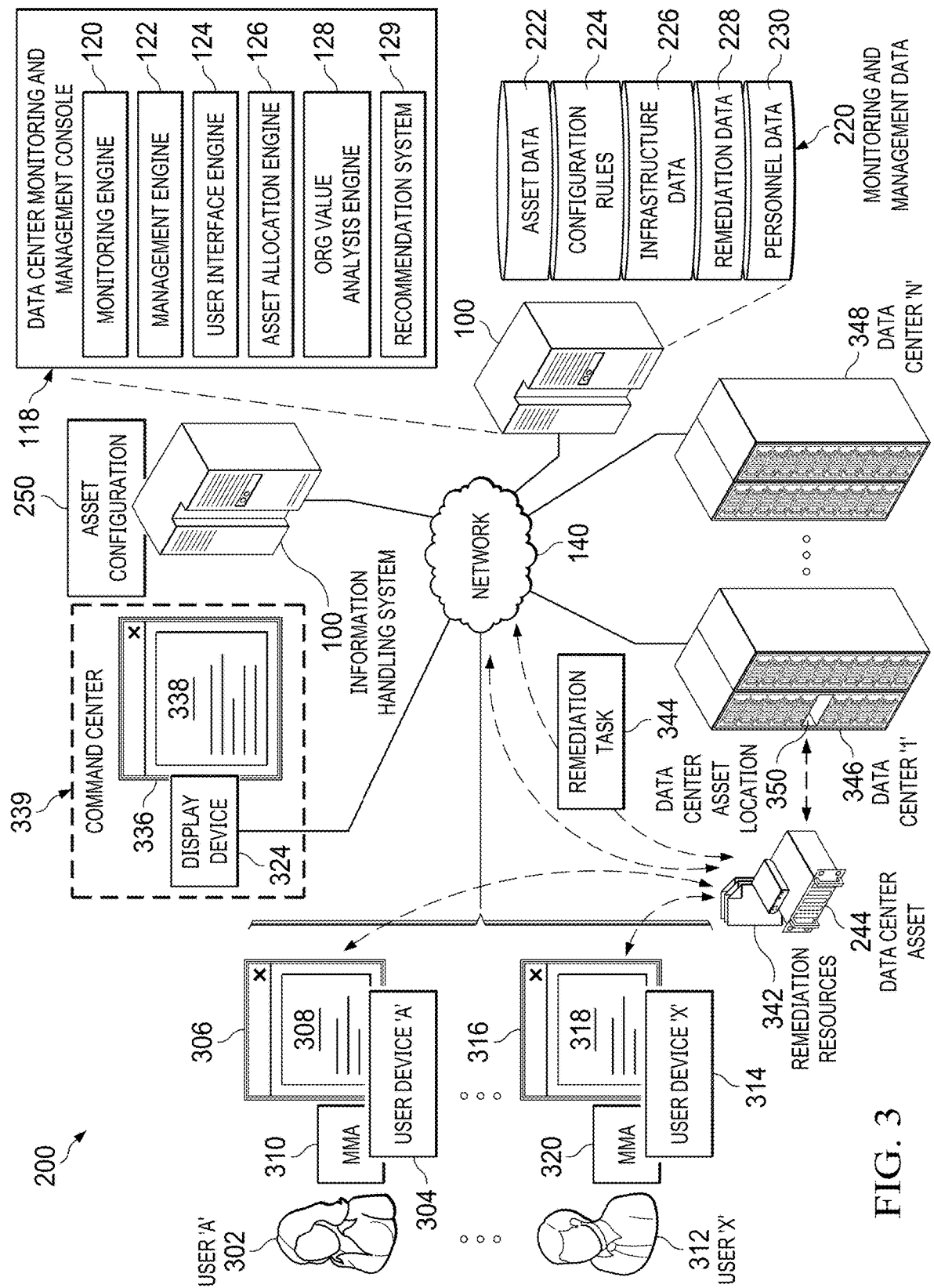
FIG. 3 shows a functional block diagram of the performance of a data center monitoring and management operation.

FIG. 3 shows a functional block diagram of the performance of a data center monitoring and management operation implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein. In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, a user interface (UI) engine 124, an asset allocation engine 126, an organizational value analysis engine 128, a recommendation engine 129 and a utilization quantification engine 131, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application 310 through 320, described in greater detail herein, may be respectively implemented on user devices 'A' 304 through 'x' 314. In certain embodiments the UI window 306 through 316 may be respectively implemented as a UI window of the data center monitoring and management application 310 through 320. In certain embodiments, the data center monitoring and management application 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the display device 324 may be implemented in a command center 339, familiar to those of skill in the art, such as a command center 350 typically found in a data center or a network operations center (NOC). In various embodiments, one or more of the users 'A' 302 through 'x' 312 may be located within the command center 339. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244 in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 339 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

Figure 4:
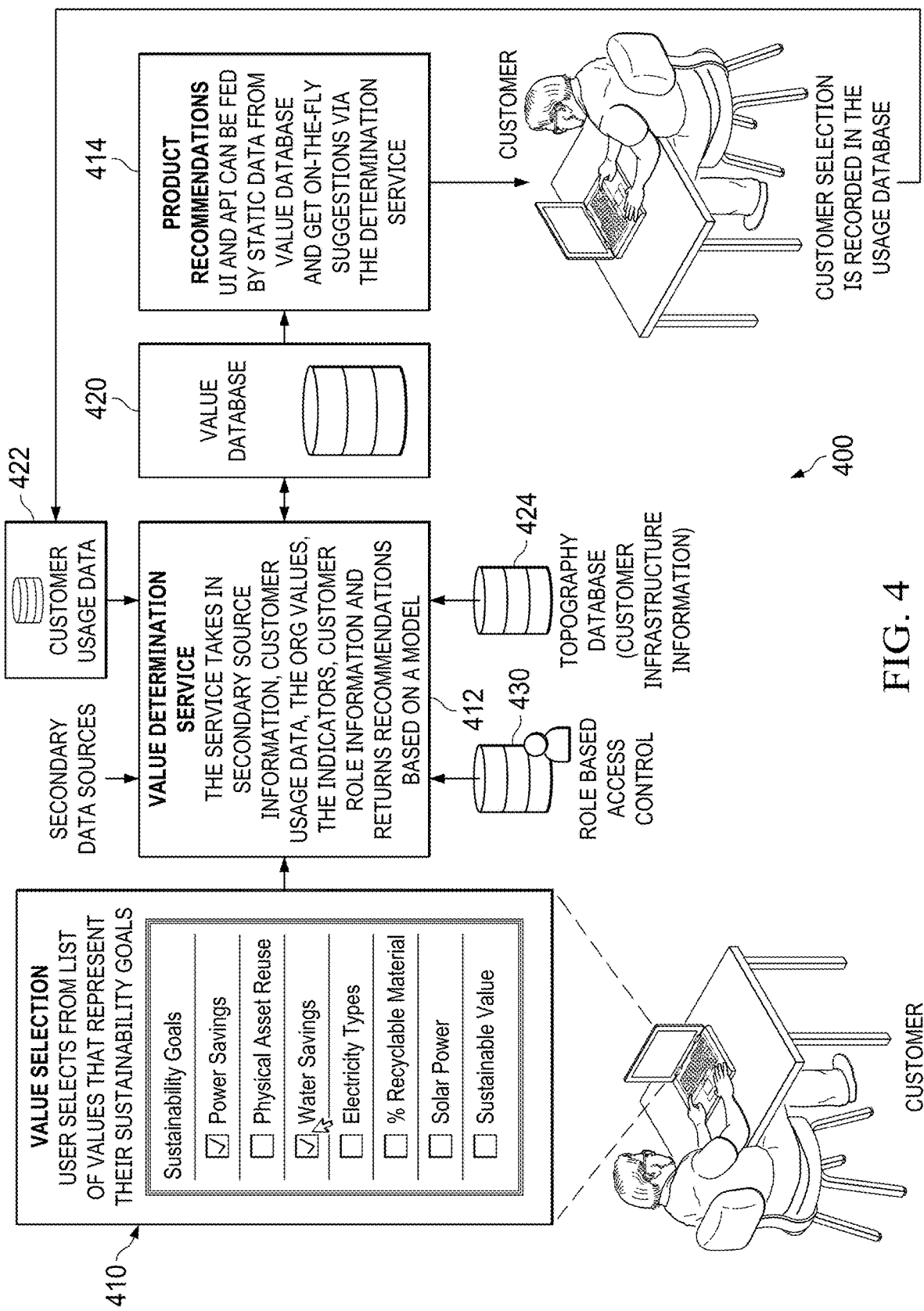
FIG. 4 shows a simplified block diagram of an organization value analysis system.

FIG. 4 shows a simplified block diagram of an organization value analysis system architecture 400 implemented in accordance with an embodiment of the invention to provide an organizational value analysis. In certain embodiments, a data center monitoring and management console, described in greater detail herein, may be implemented to include an organizational value analysis engine 128. In certain embodiments, the organizational value analysis engine 128 facilitates a determination of organizational value goals, suggests goal-aligned utilization of resources and provides data-driven measurements and insights related to the organizational value goals.

In certain embodiments, the organizational value analysis 128 engine may be implemented to include a value selection 410 module, a value determination 412 module and a project recommendation 414 module. In certain embodiments, the organizational value analysis system architecture 400 may include one or more of a repository of value data 420, a repository of customer usage data 422, a repository of topographic information 424. In certain embodiments, the organizational value analysis system architecture 400 may include a role based access control module 430. In certain embodiments, the repository of customer usage data 422 stores customer usage information. In certain embodiments, the repository of topographic information 424 stores customer infrastructure information. In certain embodiments, the organizational value analysis system architecture 400 may include a role based access control module 430. In certain embodiments, the role based access control module 430 stores customer role information.

In certain embodiments, the organizational value analysis 128 engine may be implemented to perform an organizational value analysis operation. As used herein, an organizational value analysis operation broadly refers to any task, function, operation, procedure, or process performed to provide an organizational value analysis on one or a plurality of data center asset resources, described in greater detail herein. As used herein, organizational value broadly refers to the core ethics or principals by which a company will abide. Strongly, clearly articulated organizational values provide a true reflection of an organization's aspirations for appropriate workplace behavior and provide an important role in building a positive culture within the organization. Examples of organizational goals include sustainability, diversity and inclusion. As used herein, sustainability broadly refers to avoidance of depletion of natural resources to maintain an ecological balance. As likewise used herein, information technology environment sustainability broadly refers to maintaining tradeoffs within the information technology environment to avoid depletion of one or more natural resources.

As likewise used herein, a data center asset resource broadly refers to a discrete aspect, element, or component of a data center asset that can be utilized, directly or indirectly, in whole or in part, to process a particular workload. Examples of data center asset resources include a central processing unit (CPU), or an individual core or cycles thereof, memory, such as random access memory (RAM), or a portion thereof, storage, such as a disk drive, or a portion thereof, an input/output (I/O) port, such as an I/O port of a server, router, or network switch, and so forth. A workload, as used herein, broadly refers to a measure of information processing that can be performed by one or more data center asset resources, individually or in combination with one another, within a data center monitoring and management environment, described in greater detail herein. In certain embodiments, a workload may be implemented to be processed in a virtual machine (VM) environment, familiar to skilled practitioners of the art. In various embodiments, a workload may be implemented to be processed as a containerized workload, likewise familiar to those of skill in the art.

In certain embodiments, the value selection 410 module may be implemented to perform value selection operation. As used herein, a value selection operation broadly refers to any task, function, operation, procedure, or process performed to select one or more values that represent sustainability goals within a data center monitoring and management environment. Examples of sustainability goals can include a power savings goal, a physical asset reuse goal, a water saving goal, an electricity type goal, a recyclable material goal, a solar power goal and a sustainable value goal. As used here, a sustainable value goal broadly refers to a measure of sustainability of one or more asset resources. In certain embodiments, the value selection 410 module enables a customer to opt-in to sustainability goals which are meaningful to the customer's organization. In various embodiments, the value selection 410 module thus supports measurement of sustainability areas which are in alignment with the organization values of the organization. In various embodiments, these goals are aligned with sustainability priorities such as a lowest power consumption priority, a solar power consumption priority, a wind power consumption priority, a lowest carbon emission priority (which may be calculated based on power consumption plus power sources), a reuse of equipment priority (which can include repurposing existing equipment or using refurbished equipment and can be aligned with a goal of reducing new equipment purchasing or new material utilization), a recycled material priority, a particular vendor/manufacturer priority (which can be used to prioritize vendors/manufacturers with high supply chain 'green' efficiency ratings), and a geographic eco rating priority (which can be prioritized based on rankings for hosting physical location environmental policies).

In certain embodiments, the value determination 412 module may be implemented to perform a value determination operation. As used herein, a value determination operation broadly refers to any task, function, operation, procedure, or process performed to generate one or more recommendations based upon selected values that represent organizational goals within a data center monitoring and management environment. In certain embodiments, the value determination 412 module receives information from one or more of secondary data sources, customer usage data, organizational values provided by the value selection 410 module, and customer role information. In certain embodiments, the value determination 412 module generates organizational value recommendations based upon the one or more of secondary data sources, customer usage data, organizational values provided by the value selection 410 module, and customer role information. In certain embodiments, the recommendations are generated according to a pre-defined organizational value model. In certain embodiments, the value determination 412 module enables self-selection and then weighting of organization values and organizational value attributes as they relate to IT infrastructure decisions. In certain embodiments, the value determination 412 module generates a weighted list of organizational values based upon the self-selection and weighting. This weighted list can then be used with the topography infrastructure data and secondary data sources to determine which automation recommendations and infrastructure locations are in the highest alignment with the organizational values and organizational values identified by the particular customer. The infrastructure may be able to meet one or more aspects of this weighted list. The number of aspects which the weighted list meets is utilized to compose a score or a percent of the values alignment as further described in FIG. 5. In certain embodiments, the automation recommendations and infrastructure locations may be filtered according to the access control data. In certain embodiments, user selection may be used to inform future recommendations and to allow for feedback regarding the automation recommendations and infrastructure locations.

Various aspects of the present disclosure include an appreciation that some organizational goals may occur in more than one value segment. Accordingly, the organizational goal analysis operation provides an option for a user to select a goal and to view related values and related goals. In certain embodiments, the organizational value analysis operation creates a process that ties visualization of values and sub-goals to a graph. Using this graph, a subcomponent of a value may be selected and various goals and sub-goals may be selected or deselected. Using the graph, a user can zoom in on a selected category or goal. Accordingly, the organizational goal analysis operation facilitates visualization and interaction with organizational value and sub-goals that enables users to identify contextual relevance.

In certain embodiments, the project recommendation 414 module may be implemented to perform a project recommendation operation. As used herein a project recommendation operation broadly refers to any task, function, operation, procedure, or process performed to present the recommendations generated by the value determination 412 module. In certain embodiments, the project recommendation 414 module generates a project recommendation user interface. In certain embodiments, the recommendations may be retrieved as static data from the repository of value data 420. In certain embodiments, the recommendations may be dynamically provided via the value determination 412 module. In certain embodiments, the recommendations are provided to the value determination module 412 via a set of value recommendation application program interfaces (API). In certain embodiments, interactions between a customer and the presented project recommendations are stored in the repository of value data 420.

In certain embodiments, the organizational goal values are stored within the repository of value data. In certain embodiments, the organizational goal values are stored in a database as a table. In certain embodiments, the database stores user selected organizational values, selected attributes and the ordering of values and attributes. In certain embodiments, the user selected organizational values, selected attributes and the ordering of values and attributes in the form of:

[OrganizationIDPrimaryKey, UserIdSecondaryKey, OrganizationalValueOrderedArray(OrganizationalValue1, OrganizationalValue2, OrganizationalValueN), OrganizationalValueAttributeOrderedArray(OrganizationalValue1.Attribute1, OrganizationalValue1.AttributeN, OrganizationalValueN.AttributeN), optionalImmutable(OrganizationalValueN.AttributeN), DateTimeStamp].

In certain embodiments, a secondary table may be generated which stores a detailed set of automation and recommendation decisions that map to an organizational value attribute. In certain embodiments, a secondary table entry may be stored in the form of:

[OrganizationalValueFK, Organizational ValueAttributePK, descriptionstring, AutomationValueArray].

In certain embodiments, the automation value array is used to specify automation and recommendation decisions that align with a particular organizational value attribute. For example, a sustainability value of utilization of equipment with recycled materials. In certain embodiments, the automation value array can include query or filter statements which enable automation of hardware purchase suggestions. For example, a filter statement might include (hardwareSuggestions, recycledMaterials=true) which would enable automation for hardware purchase selections to include hardware components having recycled material utilization.

For example, a cloud vendor might have two customers, Customer A and Customer B. Customer A has set a primary organizational value as cost savings, lowest equipment cost and labor cost for the next 30 days and a secondary organizational value as sustainability, attribute use solar power. Customer B has set a primary organizational value as geography, attribute Canada only, a secondary organizational value as flexibility, attribute scale on demand, and a third organizational value as cost savings, lowest equipment cost and labor cost for the next 30 days.

When Customer A requests a new workload deployment, the organizational values analysis operation analyzes the compute and storage needed for the requested workload. In one example, three data centers might be identified as having similar costs to meet the primary organizational value of the customer and thus all three data centers meet the primary attribute. Having met the primary attribute, the organizational values analysis operation then analyzes the secondary attribute. More specifically, the organizational values analysis operation accesses the topography database and attempts to match the source of power that is available in the infrastructure. For example, the organizational value analysis operation might determine that data center location XYZ is primarily solar powered and thus meets the secondary organizational value. Accordingly, the organizational value analysis operation recommends deployment of the new workload at data center location XYZ. In this case as all attributes are met, there is a one hundred percent match.

When Customer B requests a new workload deployment, the organizational analysis operation analyzes the compute and storage needed for the requested workload. In one example, four data centers might be identified as being located in Canada, thus meeting the primary organizational value. Having met the primary attribute, the organizational values analysis operation then analyzes the secondary attribute. More specifically, the organizational values analysis operation determines which of the four data centers located in Canada have a scale on demand capability. For example, the organizational value analysis operation might determine that Cloud Data Center A and a Hosted IaaS have this capability. Having identified more than one option that meets the secondary attribute, the organizational values analysis operation then analyzes the third attribute. For example, the organizational value analysis operation might determine that a hosted IaaS Toronto placement option has the lowest cost. Accordingly, the organizational value analysis operation recommends deployment of the new workload at the hosted IaaS placement option.

When the recommendations are presented to the user in a transparent manner to facilitate selection by the user. Once selected, the user can automate these value-based decisions during future workload deployment requests. Once a choice has been completed, the user choices are stored in a UserChoice table within the value database. Also, a value determination service of the organizational value analysis system can reevaluate recommendations on an ongoing basis based on audit information or new secondary information.

In certain embodiments, when the organizational values selection includes sustainability organizational values, the sustainability organizational values are stored within the repository of value data 420. In certain embodiments, the sustainability organization values are stored in a database as a table. In certain embodiments, the sustainability organization values are stored as an entry in the table in the form of:
 [OrganizationIDPrimaryKey, UserIdSecondaryKey, SustainabiltyValueOrderedArray(Value3SecondaryKey, Value7SecondaryKey,etc), OptionalAutomationTypeSecondaryKey, DateTimeStamp].

In certain embodiments, the sustainability analysis operation includes a value determination service. In certain embodiments, the value determination service receives the user stated sustainability value selections and priority order. The value determination service correlates the selection to available secondary source information to generate an organizational value indicator ranking. In certain embodiments, the secondary source information is received from secondary data sources. In certain embodiments, the secondary data sources include one or more of a role-based and organizational data source, geographic location data source, electric company reports, topographic databases, manufacturer bill of materials, new articles/press releases, and manufacturing rating databases.

In certain embodiments, the secondary source information is collected on a regular basis. In certain embodiments, some or all of the secondary source information is stored in the repository of topographic information 424. In certain embodiments, the repository of topographic information 424 stores customer infrastructure information as a table in a database. In certain embodiments, entries in the table are stored as:
 [AssetIDPrimaryKey, PowerRating, PowerConsumptionPerX, SecondaryKeyDataCenter (includes power source percents), Manufacturer(SecondaryKeyBuildofMaterials), SecondarySourceManufacturerRatings, AssetRecycledMaterialPercent,CalculatedCarbonEmmissionsPerX,AddlArray, DateTimeStamp].

In certain embodiments, for assets which are part of a cloud or cluster a rollup table entry may be generated to include a series of assets which are members of the aggregated location. In certain embodiments, the rollup table entry may be stored as:
 [ClusterIDPrimaryKey, AssetMemberArray(AssetIDSecondaryKeys), PowerRating, PowerConsumptionPerX, SecondaryKeyGeography (includes power source percents), Manufacturer, SecondarySourceManufacturerRatings, AssetRecycledMaterialPercent,CalculatedCarbonEmmissionsPerX,AddlArray, DateTimeStamp].

In certain embodiments, when the recommendation is calculated, the recommendation is stored within the repository of value data 420. In certain embodiments, storing the recommendation within the repository of value data 420 allows the recommendation to be auditable thus providing transparency to the recommendation.

In certain embodiments, when the recommendation is calculated, the recommendation engine 414 uses the sustainability ranking stored in the value database 420 to suggest configurations that provide a best fit to the recommendation. In certain embodiments, one or more suggested configurations are provided to a configuration system (such as configuration system 252). The configuration system provides the configuration to a fabrication system (such as fabrication system 254) which physically fabricates a system corresponding to the best sustainability fit.

For example, with a particular customer, a customer sustainable value preference is to use solar power. Using the topography database, the recommendation engine 414 matches the type of power that is in the infrastructure available. Accordingly, a particular data center location (XYZ) might be primarily solar-powered (thus meeting the customer's primary value). Within location XYZ, a customer might choose to use a cluster which is includes a new form factor called "ServerClusterGreen" which is made out of recycled materials, thus meeting a secondary sustainability goal of the customer as well. The recommendation is presented to the customer in a transparent manner so the customer could continue with the recommendation or select a different choice. The customer could opt to automate these value-based decisions moving forward. Once the choice is completed, the customer choices are stored in a UserChoice table within the value database 420. Additionally, the value determination service can reevaluate future recommendations based on the audit information or additional secondary information.

Figure 5:
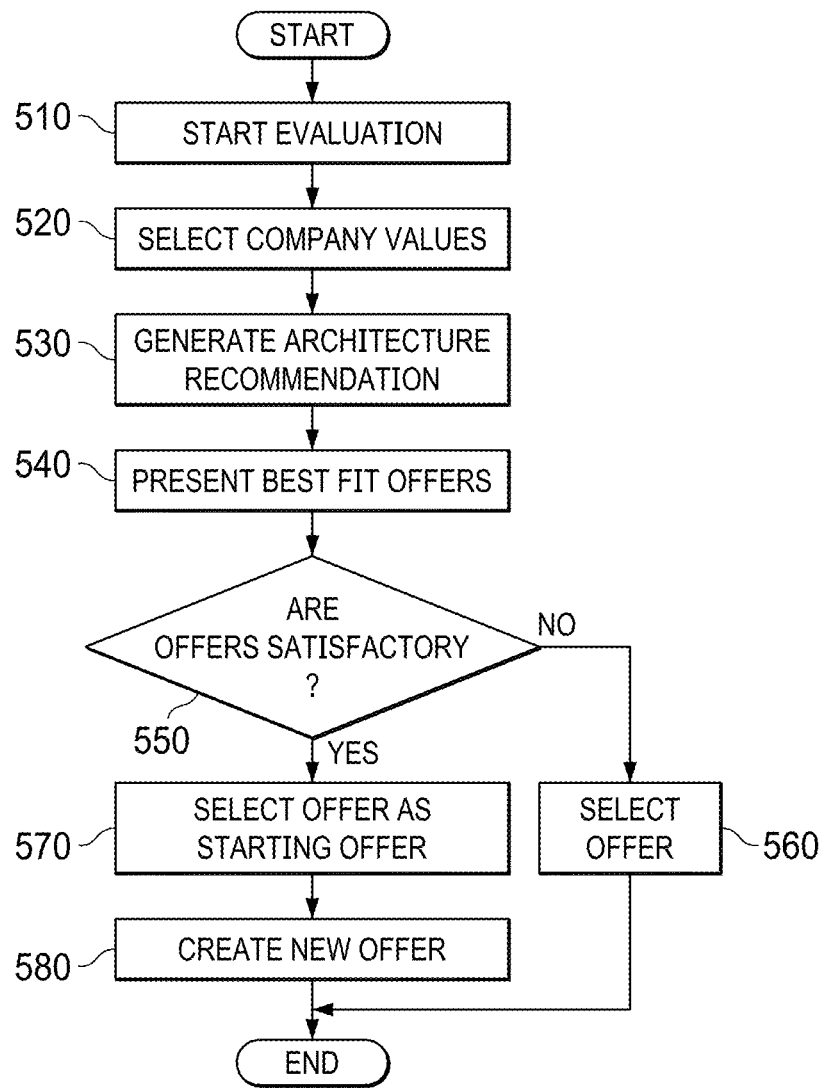
FIG. 5 shows a flow chart of an organizational value data center infrastructure recommendation operation.

FIG. 5 shows a flow chart of an organizational value data center infrastructure recommendation operation 500. The organizational value data center infrastructure recommendation operation 500 begins at step 510 when a user indicates a desire to start an organization value data center recommendation evaluation. Next, at step 520, the user selects one or more organizational values for the company. Next, at step 530 the organizational value data center infrastructure recommendation operation 500 generates an architecture recommendation. In certain embodiments, the organizational value data center infrastructure recommendation operation 500 generates a plurality of architecture recommendations. In certain embodiments, the recommendations are generated by a combination of the organizational value analysis engine 128 and the recommendation engine 129. As part of this recommendation, the list of organizational values as ordered by the user is aligned with the infrastructure options. The infrastructure options may meet all of the organizational values, in which case the score is 100%. In the case where recommendations do not meet all of the organizational values, a values score is calculated using a value scoring operation. In certain embodiments, value scoring operation includes a divisor, where the denominator is the full list of organizational values and the numerator is the number of values that are met with the architectural recommendation. In the example where a company selects ten total values, and the architectural recommendation meets five of the values, the overall score is 50%. In another embodiment, the values may be weighted by the priority of the customer. For example, if the customer has ten total values, and identifies their top priority as a power source being solar power, and the bottom priority choice is labor savings. The weighting of the top priority could be 50%, the second could be 25% of the value weighting, the third will be 12.5% of the value weighting and so on. In this case, if the primary value of solar power cannot be met, the values matching score would not be above 50%.

Next, at step 540 the organizational value data center infrastructure recommendation operation 500 presents the one or more generated architecture recommendations to the user. Next, at step 550 the user indicates whether any of the presented recommendations are satisfactory. If yes, then at step 560 the user selects one of the recommended architectures and the operation completes. If no, then at step 570 the organizational value data center infrastructure recommendation operation 500 presents one or more architecture recommendation templates to the user as a starting point for generation of a customer architecture. Next, at step 580 the user creates a new data center infrastructure offer from one of the architecture recommendation templates and the operation completes.

FIGS. 6A, 6B, 6C and 6D, generally referred to as FIG. 6, shows example screen presentations of user interfaces generated during an organizational value data center infrastructure recommendation operation. In this embodiment, a data center monitoring and management console UI (e.g., UI 240) is implemented to display organizational value recommendation windows.

Figure 6A:
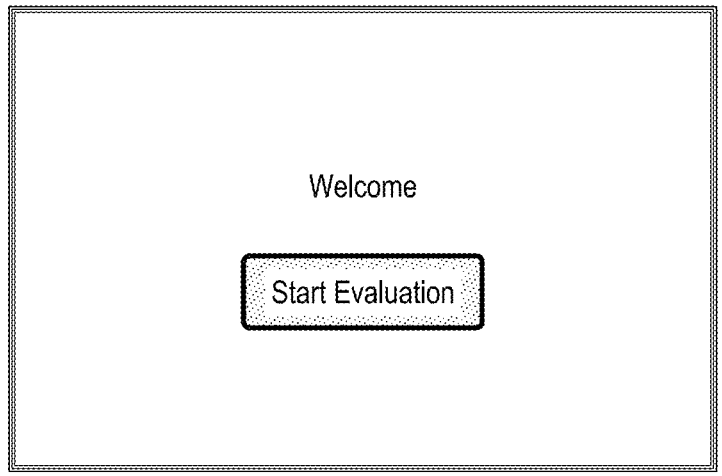
FIGS. 6A, 6B, 6C and 6D, generally referred to as FIG. 6, show example screen presentations of user interfaces generated during an organizational value data center infrastructure recommendation operation.
Figure 6B:
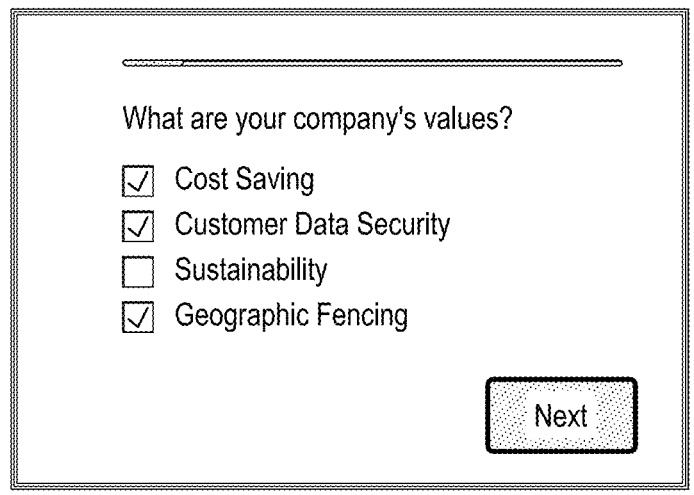
Figure 6C:
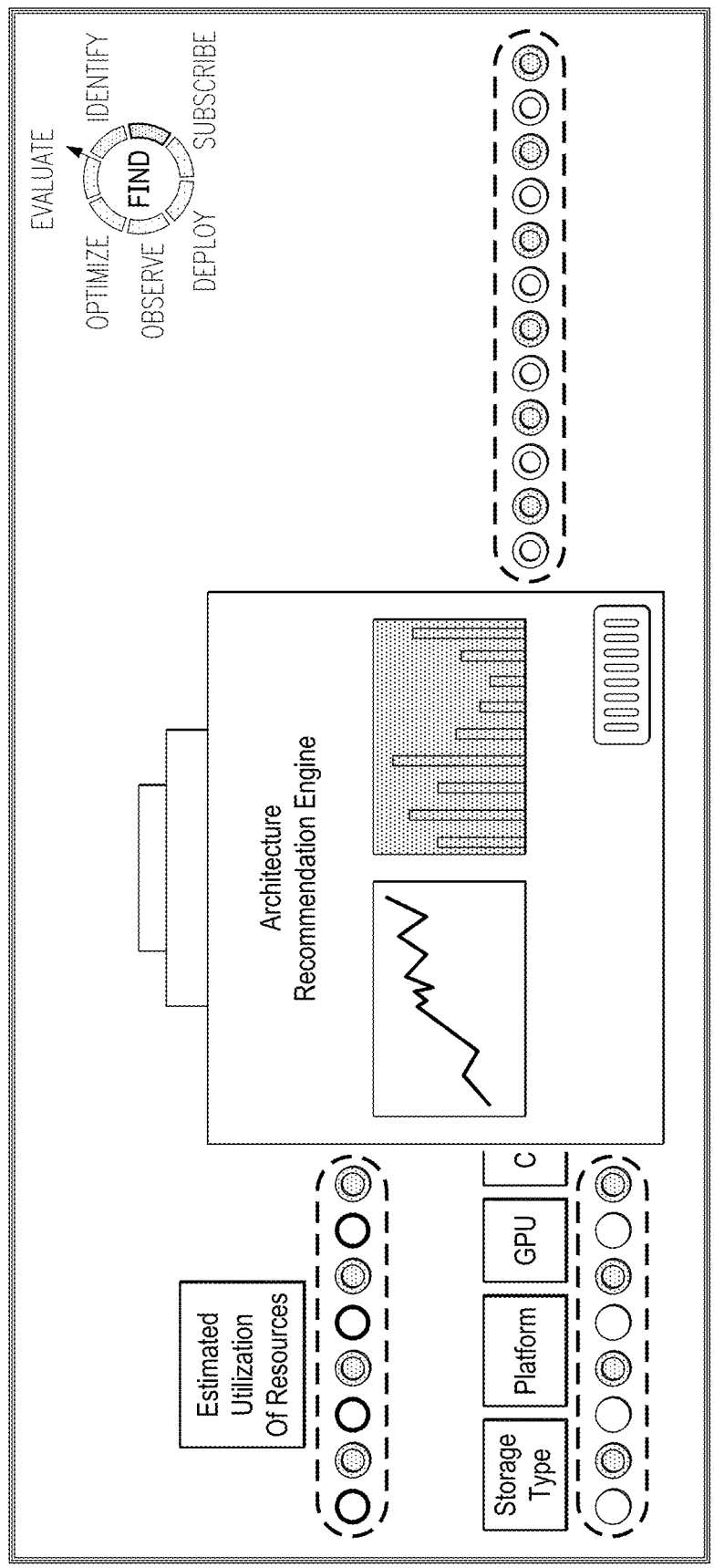
Figure 6D:
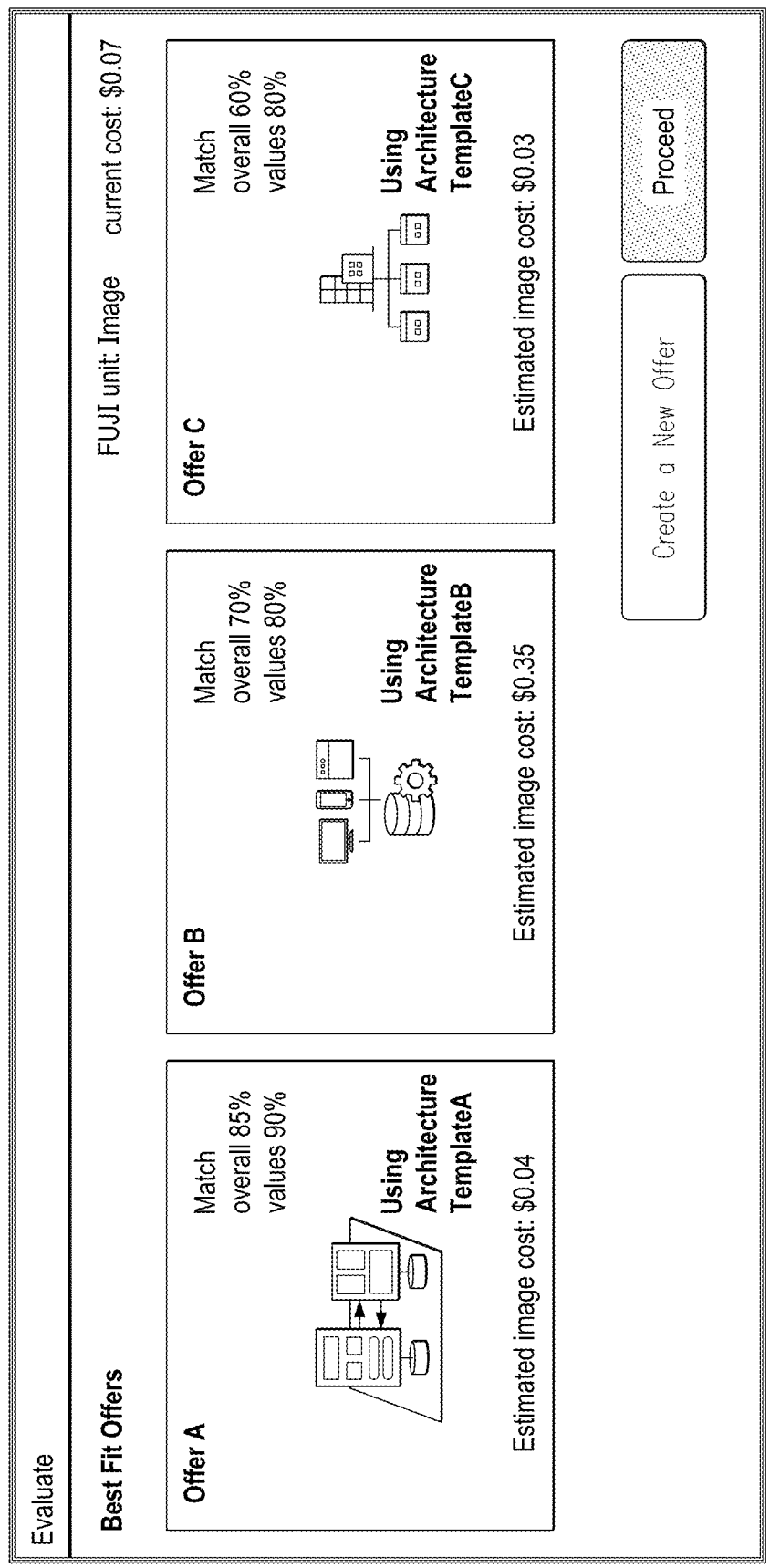

As shown in FIG. 6, the data center monitoring and management console UI may be implemented to provide a user with the ability to select (i.e., to identify) one or more organizational values (see e.g., FIG. 6B). In certain embodiments, selections made via the recommendations windows are provided to the value selection 410 module. In certain embodiments, the data center monitoring and management console UI may be implemented to provide a user with an indication that recommendations are being generated (see e.g., FIG. 6C). In certain embodiments, the data center monitoring and management console UI may be implemented to provide a user with one or more infrastructure recommendations (see e.g., FIG. 6D). In certain embodiments, the one or more best fit infrastructure recommendations (e.g., offers) are provided via the value recommendation 414 module. In certain embodiments, the indications of how the recommendation aligns include a presentation of a percent of how the recommendation aligns with the organizational values. In certain embodiments, the recommendations include an indication of how the recommendation aligns with one or more of the organizational values identified as important to the organization. In certain embodiments, the recommendations include a particular data center infrastructure architecture template that can be used to configure an aspect of data center infrastructure.

Figure 7A:
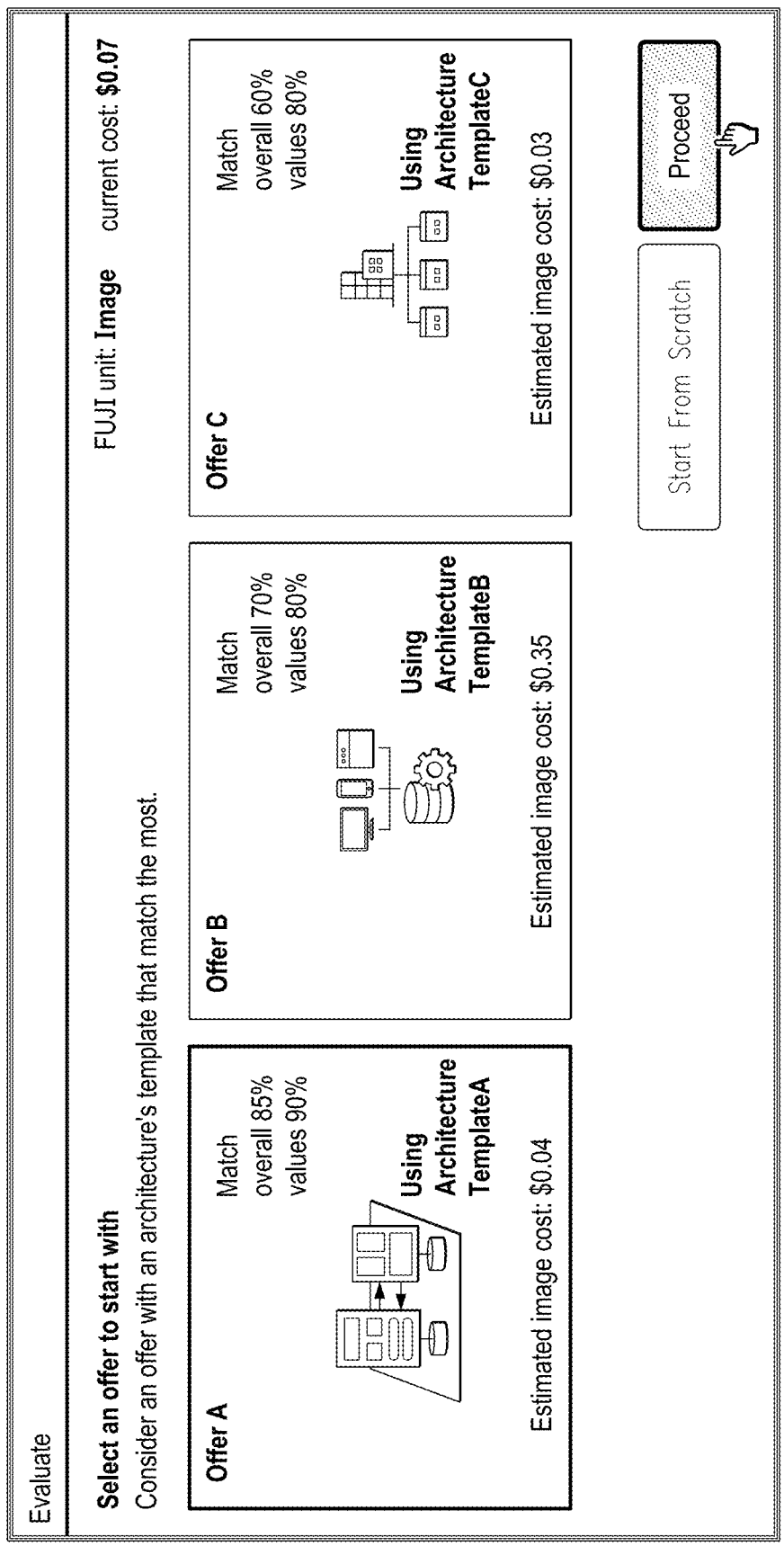
Figure 7B:
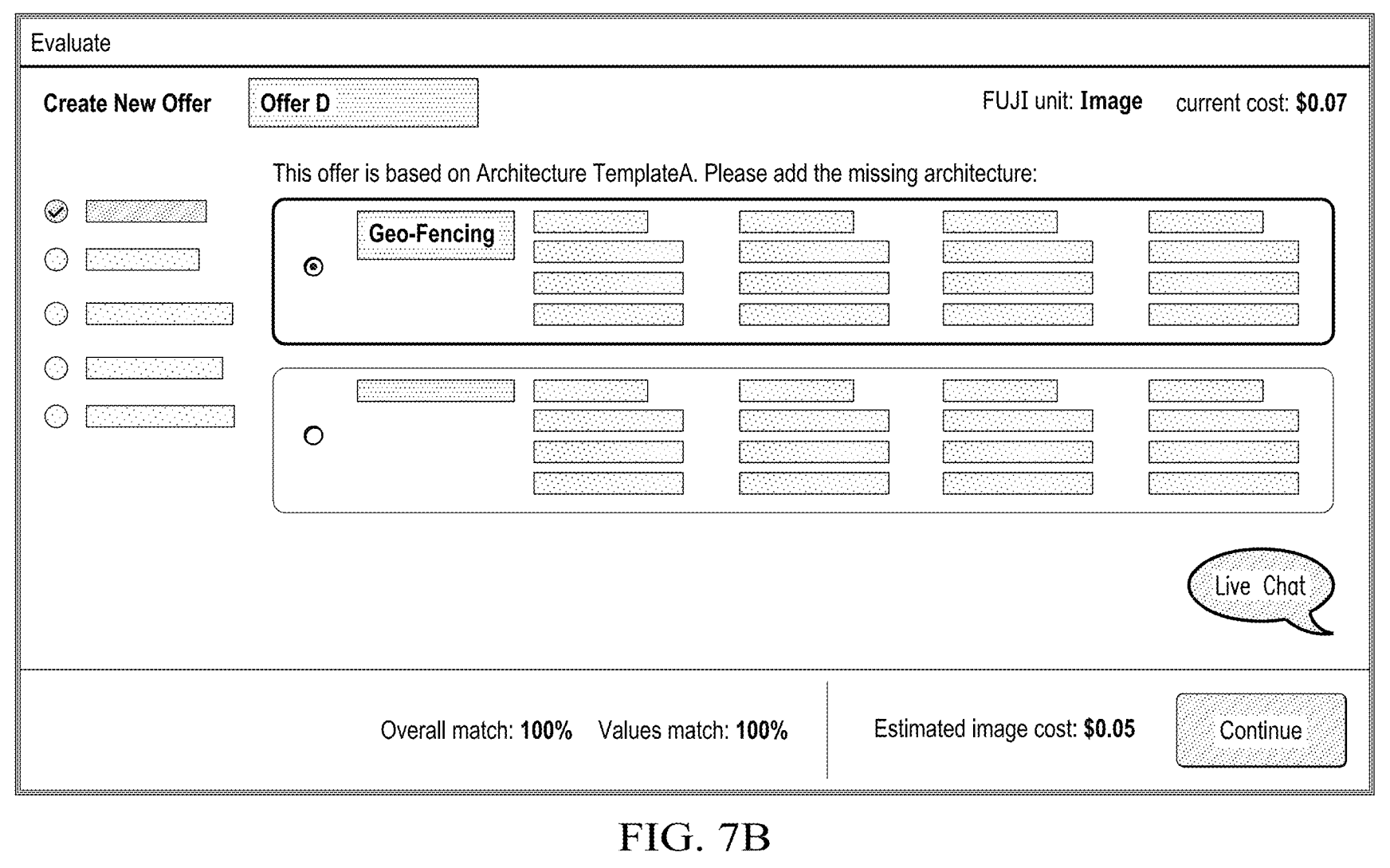

FIGS. 7A and 7B, generally referred to as FIG. 7, show example screen presentations of user interfaces generated during an organizational value data center infrastructure recommendation operation. In this embodiment, a data center monitoring and management console UI (e.g., UI 240) is implemented to display organizational value configuration windows 700.

As shown in FIG. 7, the data center monitoring and management console UI may be implemented to provide a user with the ability to select a particular organizational value data center infrastructure configurations as a starting point for creating a new data center infrastructure configuration (see e.g., FIG. 7A). In certain embodiments, selections made regarding the particular organizational value data center infrastructure configuration is used as a starting point for creating a new offer (see e.g., FIG. 7B). In certain embodiments, the presentation for starting the new offer includes an indication of how the new offer conforms to particular organizational values. In certain embodiments, the presentation for starting the new offer includes an indication of includes an indication of how the new offer compares to the selected particular organizational value data center configuration.

Figure 8:
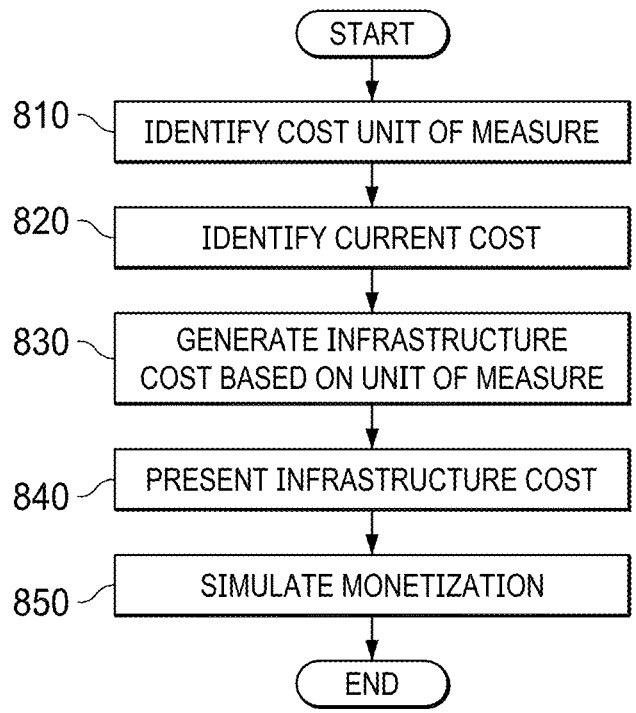
FIG. 8 shows a flow chart of a data center infrastructure utilization quantification operation.

FIG. 8 shows a flow chart of a data center infrastructure utilization quantification operation 800. The data center infrastructure utilization quantification operation begins at step 810 with a user identifying a particular data center infrastructure utilization unit. In certain embodiments, the data center infrastructure utilization unit is associated with a particular business aspect relating to the user. For example, if the business is associated with processing images, the data center infrastructure utilization unit might be a cost per image. Also, for example, if the business is associated with managing a plurality of storefronts, either physical or virtual, then the data center infrastructure utilization unit might be a cost per storefront.

Next at step 820 the user can optionally provide information regarding a present data center infrastructure utilization unit quantification. Next at step 830, the data center monitoring and management console 118 generates a data center infrastructure utilization quantification for a particular data center infrastructure utilization unit of measure. In certain embodiments, the data center infrastructure utilization quantification is calculated using a data center infrastructure utilization quantification scoring operation. As used herein, a data center infrastructure utilization quantification scoring operation broadly refers to any function, operation, procedure, or process performed, directly or indirectly, within a data center monitoring and management environment 200 to calculate a data center infrastructure utilization quantification score. As used herein, a data center infrastructure utilization quantification score broadly refers any measure of a relationship between a data center infrastructure utilization unit and an aspect of a configuration of a data center.

In certain embodiments, the center infrastructure utilization quantification operation may be a divisor, where the denominator is the data center infrastructure utilization unit and the numerator is the cost of the data structure infrastructure recommendation. In certain embodiments, the numerator may be the cost of the base data structure infrastructure recommendation and the cost of the add-on services of the data structure infrastructure recommendation.

Next at step 840, the selections made regarding the particular data center infrastructure utilization unit are used to present a new offer which includes information regarding how a particular data center infrastructure configuration relates to the particular data center infrastructure utilization unit of measure. In certain embodiments, the presentation for the new offer includes a graphical representation of a data center infrastructure configuration. Next at step 850 the data center monitoring and management console 118 provides a user with information regarding quantification (e.g., monetization) of the particular infrastructure configuration based upon the particular data center infrastructure utilization unit. In various embodiments, the quantification of the particular infrastructure configuration can include information regarding quantification of a particular infrastructure base service configuration based upon the particular data center infrastructure utilization unit. In certain embodiments, the quantification of the particular infrastructure configuration based upon the particular data center infrastructure utilization unit can also include a quantification associated with one or more add-on services for the data center infrastructure configuration. In certain embodiments, the quantification of the particular infrastructure configuration based upon the particular data center infrastructure utilization unit can also include representation of a simulated profit. In certain embodiments, the representation of the simulated profit is generated based upon the quantification of the particular infrastructure configuration based upon the particular data center infrastructure utilization unit.

Such a data center infrastructure utilization quantification operation advantageously enables an infrastructure provider to present quantification information to a particular customer in units that are important to the particular customer.

FIGS. 9A, 9B, 9C and 9D, generally referred to as FIG. 9, show example screen presentations of user interfaces generated during a data center infrastructure utilization quantification operation. In this embodiment, a data center monitoring and management console UI (e.g., UI 240) is implemented to display data center infrastructure utilization windows 900.

Figure 9A:
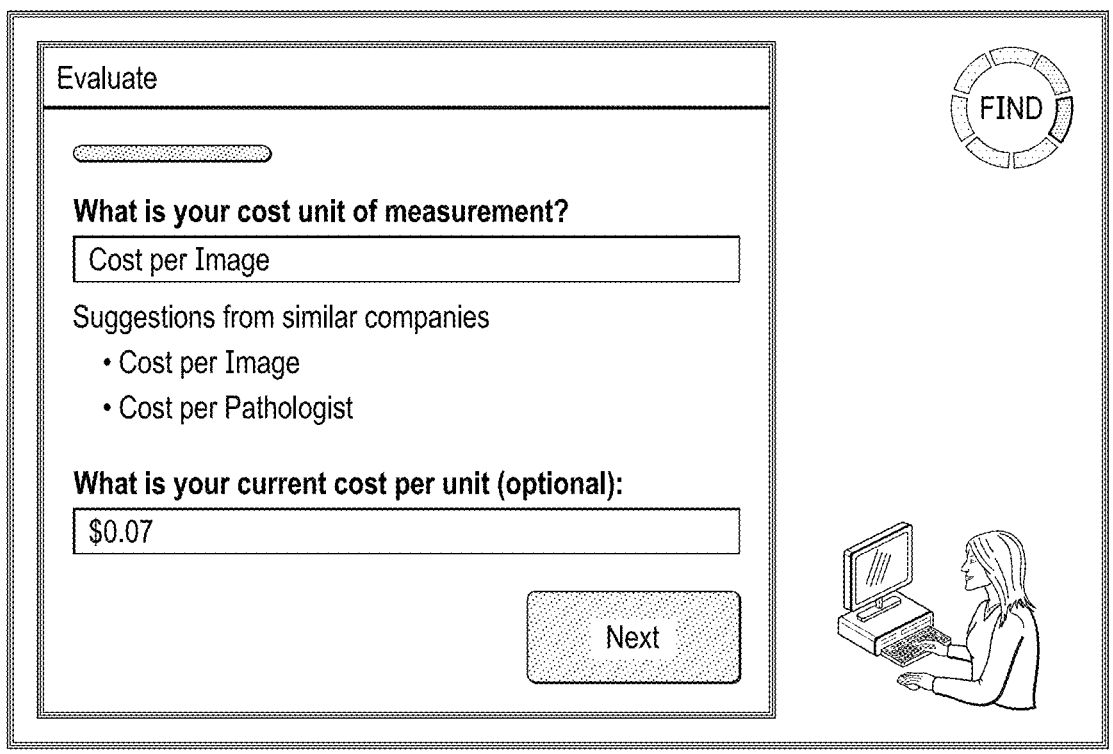
FIGS. 9A, 9B, 9C and 9D, generally referred to as FIG. 9, show example screen presentations of user interfaces generated during a data center infrastructure utilization quantification operation.
Figure 9B:
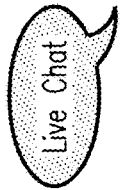
Figure 9C:
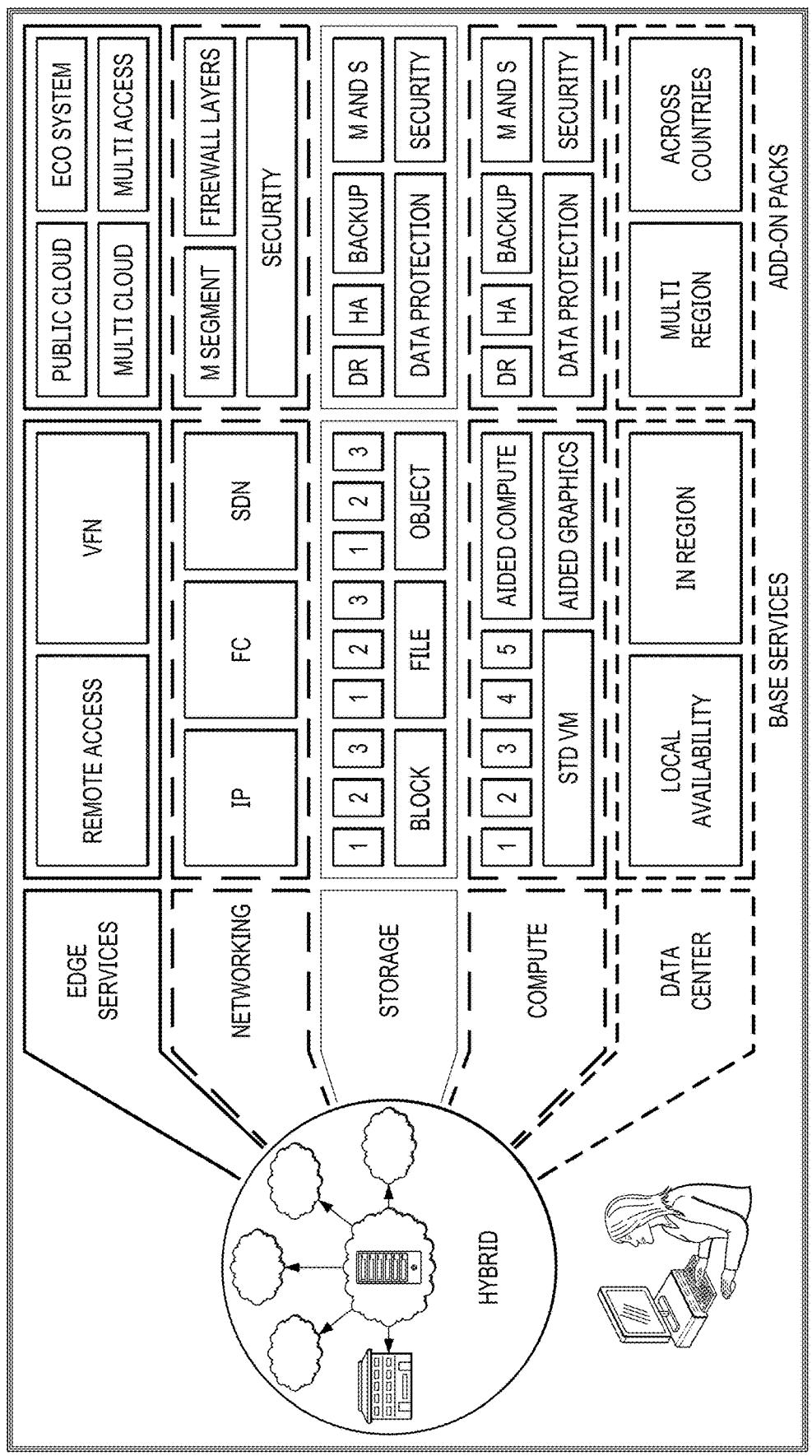

As shown in FIG. 9, the data center monitoring and management console UI may be implemented to provide a user with the ability to select a particular data center infrastructure utilization unit (see e.g., FIG. 9A). In certain embodiments, the user can optionally provide information regarding a present data center infrastructure utilization unit quantification. In certain embodiments, selections made regarding the particular data center infrastructure utilization unit are used as a starting point for creating a new offer (see e.g., FIG. 9B). In certain embodiments, the presentation for starting the new offer includes a graphical representation of a data center infrastructure configuration (see e.g., FIG. 9C). In certain embodiments, the graphical representation of the data center infrastructure configuration can include a graphical representation of a data center infrastructure configuration for a base service. In certain embodiments, the graphical representation of the data center infrastructure configuration can include a graphical representation of a data center infrastructure configuration for one or more add-on services.

Figure 9D:
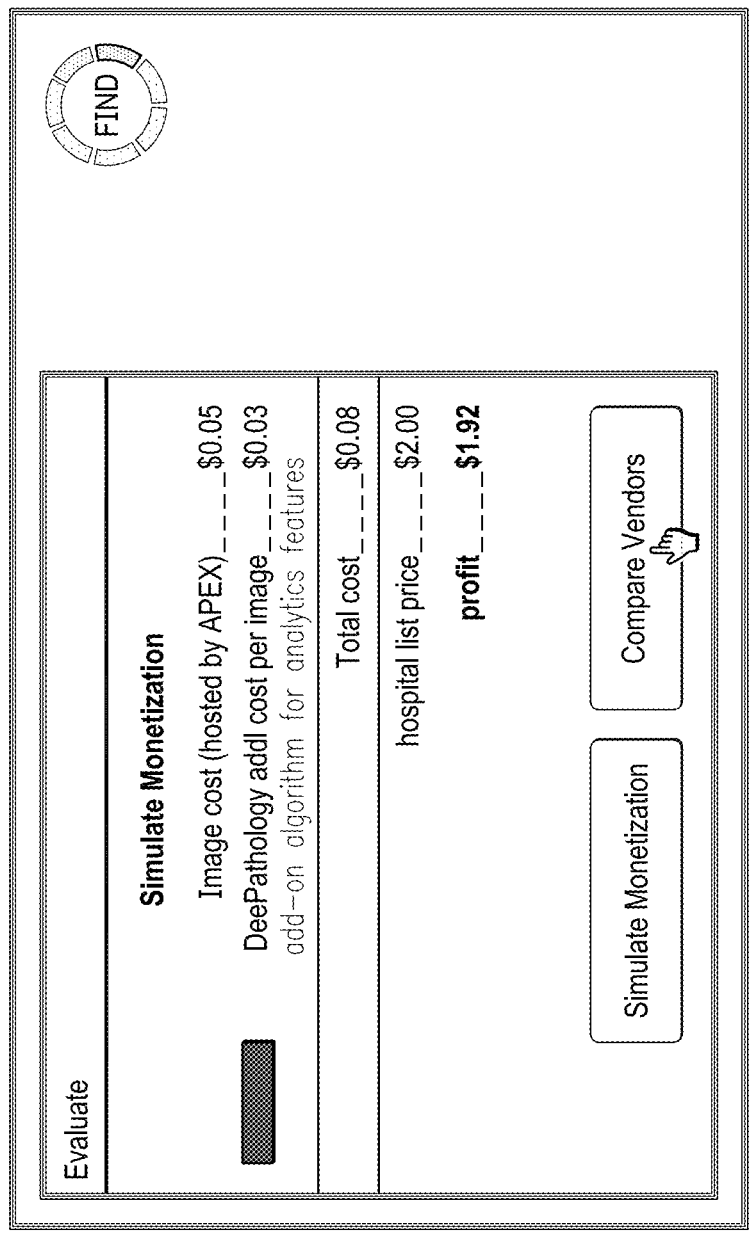

In certain embodiments, the data center monitoring and management console UI may be implemented to provide a user with a quantification of a particular infrastructure configuration based upon the particular data center infrastructure utilization unit (see e.g., FIG. 9D). For example, the data center infrastructure utilization unit might be related to a cost per image. The quantification of the particular infrastructure configuration is presented as a cost per image for a particular infrastructure configuration. In certain embodiments, the quantification of the particular infrastructure configuration based upon the particular data center infrastructure utilization unit can also include a cost associated with one or more add-on services for the data center infrastructure configuration. In certain embodiments, the quantification of the particular infrastructure configuration based upon the particular data center infrastructure utilization unit can also include representation of a simulated profit. In certain embodiments, the representation of the simulated profit is generated based upon the quantification of the particular infrastructure configuration based upon the particular data center infrastructure utilization unit. For example, when the data center infrastructure utilization unit is related to a cost per image, simulated profit is presented as an estimated profit per image for a particular infrastructure configuration.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
    identifying a data center infrastructure utilization unit associated with an information technology (IT) environment, the IT environment including a data center asset;
    analyzing the IT environment based upon the data center infrastructure utilization unit, the analyzing being performed via a data center monitoring and management console, the data center monitoring and management console including a user interface engine and an organizational value analysis engine, the user interface engine being implemented to generate a user interface, the organizational value analysis engine being implemented to perform a data center infrastructure utilization quantification scoring operation; and,
    presenting, via the user interface generated by the user interface engine, a data center infrastructure utilization quantification based upon the analyzing, the data center infrastructure utilization quantification being based upon the data center infrastructure utilization unit; and wherein
    the data center utilization quantification is calculated using the center infrastructure utilization quantification scoring operation, the data center infrastructure utilization quantification scoring operation calculating a data center infrastructure utilization quantification score, the data center infrastructure utilization quantification score providing a measure of a relationship between the data center infrastructure utilization unit and a configuration of a data center.

2. The method of claim 1, wherein:
    the data center utilization unit is associated with a particular customer.

3. The method of claim 2, wherein:
    the data center utilization unit is associated with a particular business aspect of the particular customer.

4. The method of claim 1, wherein:
    the center infrastructure utilization quantification operation comprises a divisor, where a denominator comprises the data center infrastructure utilization unit and a numerator comprises a cost of a data structure infrastructure recommendation.

5. The method of claim 4, wherein:
    the numerator comprises the cost of the base data structure infrastructure recommendation and a cost of an add-on service of the data structure infrastructure recommendation.

6. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        identifying a data center infrastructure utilization unit associated with an information technology (IT) environment, the IT environment including a data center asset;
        analyzing the IT environment based upon the data center infrastructure utilization unit, the analyzing being performed via a data center monitoring and management console, the data center monitoring and management console including a user interface engine and an organizational value analysis engine, the user interface engine being implemented to generate a user interface, the organizational value analysis engine being implemented to perform a data center infrastructure utilization quantification scoring operation; and,
        presenting a data center infrastructure utilization quantification based upon the analyzing, the data center infrastructure utilization quantification being based upon the data center infrastructure utilization unit; and wherein the data center utilization quantification is calculated using the center infrastructure utilization quantification scoring operation, the data center infrastructure utilization quantification scoring operation calculating a data center infrastructure utilization quantification score, the data center infrastructure utilization quantification score providing a measure of a relationship between the data center infrastructure utilization unit and a configuration of a data center.

7. The system of claim 6, wherein:
the data center utilization unit is associated with a particular customer.

8. The system of claim 7, wherein:
the data center utilization unit is associated with a particular business aspect of the particular customer.

9. The system of claim 6, wherein:
the center infrastructure utilization quantification operation comprises a divisor, where a denominator comprises the data center infrastructure utilization unit and a numerator comprises a cost of a data structure infrastructure recommendation.

10. The system of claim 9, wherein:
the numerator comprises the cost of the base data structure infrastructure recommendation and a cost of an add-on service of the data structure infrastructure recommendation.

11. A non-transitory, computer-readable storage medium embodying computer program code, the computer program code comprising computer executable instructions configured for:
identifying a data center infrastructure utilization unit associated with an information technology (IT) environment, the IT environment including a data center asset;
analyzing the IT environment based upon the data center infrastructure utilization unit, the analyzing being performed via a data center monitoring and management console, the data center monitoring and management console including a user interface engine and an organizational value analysis engine, the user interface engine being implemented to generate a user interface, the organizational value analysis engine being implemented to perform a data center infrastructure utilization quantification scoring operation; and,
presenting a data center infrastructure utilization quantification based upon the analyzing, the data center infrastructure utilization quantification being based upon the data center infrastructure utilization unit; and wherein
the data center utilization quantification is calculated using the center infrastructure utilization quantification scoring operation, the data center infrastructure utilization quantification scoring operation calculating a data center infrastructure utilization quantification score, the data center infrastructure utilization quantification score providing a measure of a relationship between the data center infrastructure utilization unit and a configuration of a data center.

12. The non-transitory, computer-readable storage medium of claim 11, wherein:
the data center utilization unit is associated with a particular customer.

13. The non-transitory, computer-readable storage medium of claim 12, wherein:
the data center utilization unit is associated with a particular business aspect of the particular customer.

14. The non-transitory, computer-readable storage medium of claim 11, wherein:
the center infrastructure utilization quantification operation comprises a divisor, where a denominator comprises the data center infrastructure utilization unit and a numerator comprises a cost of a data structure infrastructure recommendation.

15. The non-transitory, computer-readable storage medium of claim 14, wherein:
the numerator comprises the cost of the base data structure infrastructure recommendation and a cost of an add-on service of the data structure infrastructure recommendation.

16. The non-transitory, computer-readable storage medium of claim 11, wherein:
the computer executable instructions are deployable to a client system from a server system at a remote location.

17. The non-transitory, computer-readable storage medium of claim 11, wherein:
the computer executable instructions are provided by a service provider to a user on an on-demand basis.

* * * * *